US006618766B1

(12) United States Patent
Eshghi

(10) Patent No.: US 6,618,766 B1
(45) Date of Patent: Sep. 9, 2003

(54) CORRELATING PROTOCOL EVENTS IN DISTRIBUTED APPLICATIONS

(75) Inventor: Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/408,734

(22) Filed: Sep. 29, 1999

(51) Int. Cl.$^7$ .................................................. G06F 9/46
(52) U.S. Cl. ...................................... 709/318; 709/230
(58) Field of Search ................................ 709/224, 318, 709/230, 223; 707/6; 714/48; 700/108

(56) References Cited

U.S. PATENT DOCUMENTS

| | | | | |
|---|---|---|---|---|
| 5,613,096 A | * | 3/1997 | Danknick | 709/236 |
| 5,781,737 A | * | 7/1998 | Schmidt | 709/224 |
| 5,805,785 A | * | 9/1998 | Dias et al. | 714/4 |
| 5,958,010 A | * | 9/1999 | Agarwal et al. | 709/224 |
| 6,216,132 B1 | * | 4/2001 | Chandra et al. | 707/103 R |
| 6,336,139 B1 | * | 1/2002 | Feridun et al. | 709/224 |
| 6,385,609 B1 | * | 5/2002 | Barshefsky et al. | 707/6 |

* cited by examiner

Primary Examiner—St. John Courtenay, III
Assistant Examiner—Van H. Nguyen

(57) ABSTRACT

Mechanisms for correlating protocol events in a distributed application to the high level transactions that caused the protocol events. The mechanisms for correlating include a set of protocol sensors which are associated with the components of the distributed application. Each protocol sensor detects the protocol events generated by its corresponding component of the distributed application. The detection of protocol events by the protocol sensors is non-invasive in that it does not require recoding or recompilation of software components or redesign or modification of hardware components. The mechanisms for correlating also include a set of event correlators associated with the protocol sensors. Each event correlator uses the results of a prior training phase for the distributed application to determine which of a set of high level transactions in the distributed application caused the corresponding protocol events.

14 Claims, 4 Drawing Sheets

CORRELATING PROTOCOL EVENTS IN DISTRIBUTED APPLICATIONS

BACKGROUND OF THE INVENTION

1. Field of Invention

The present invention pertains to the field of distributed applications. More particularly, this invention relates to correlating protocol events in distributed applications.

2. Art Background

Distributed applications including distributed applications which are used for business transactions may be viewed as multi-tier arrangements of hardware components and/or software components that support multiple users. Examples of distributed applications include web-based applications such as applications involved in e-commerce, as well as groupware applications, order processing and inventory management applications, etc. Examples of hardware components of a distributed application include CPU, memory, mass storage, and network bridges. Examples of software components of a distributed application include processes, file systems, data base servers, web servers, client applications, and server applications.

A variety of mechanisms exist for communication among the various software and/or hardware components of a distributed application. Examples include remote procedure calls (RPC), system query language (SQL), peripheral component interconnect (PCI), Ethernet, transfer control protocol/internet protocol (TCP/IP), sockets, hypertext transfer protocol (HTTP), etc. These protocols typically involve the exchange of messages between hardware and/or software components. An exchange of a message between hardware and/or software components whether on the same machine or not may be referred to as a protocol event.

Typically, the interactions of end-users with such a distributed application cause a variety of protocol events to occur at many different levels in the distributed application. Such an interaction may be an action or grouping of actions taken by an end-user of the distributed application. In addition, events generated by software tasks in a distributed application usually cause a variety of protocol events to occur at many different levels in the distributed application.

Moreover, protocol events that are directly caused by an end user action or software event typically cause more protocol events to occur at lower levels in a distributed application. In a web-based based e-commerce application, for example, an end-user action may take the form of clicking a buy button or clicking on item buttons while browsing items with a web browser. Each such click typically generates protocol events in the form of HTTP commands. Each HTTP command in turn usually generates other protocol events at lower levels in the distributed system to communicate the HTTP command to a web server. In response, the web server at still a lower level in the distributed system typically generates protocol events such as SQL statements for data base access or protocol events for file system access to carry out the HTTP command. An end user action or a software event that causes protocol events to occur at lower levels in a distributed application may be referred to as a high level transaction.

Such distributed applications typically provide support for large numbers of end user interactions and software tasks. As a consequence, large numbers of overlapping protocol events usually flow among the hardware and software components of the distributed application. It is usually desirable to correlate the protocol events in a distributed application to the high level transactions that caused them. Such a capability is useful for a variety of system management tasks such as performance monitoring, diagnosis, and capacity planning. It is also usually desirable that a mechanism that provides such correlation be non-invasive in the sense that it does not require the modification of hardware components or a rewrite and/or recompilation of the software components in the distributed application.

SUMMARY OF THE INVENTION

Mechanisms are disclosed for correlating protocol events in a distributed application to the high level transactions that caused the protocol events. The mechanisms for correlating include a set of protocol sensors which are associated with the components of the distributed application. Each protocol sensor detects the protocol events generated by its corresponding component of the distributed application. The detection of protocol events by the protocol sensors in non-invasive in that it does not require recoding or recompilation of software components or redesign or modification of hardware components. The mechanisms for correlating also include a set of event correlators associated with the protocol sensors. Each event correlator uses the results of a prior training phase for the distributed application to determine which of a set of high level transactions in the distributed application caused the corresponding protocol events.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
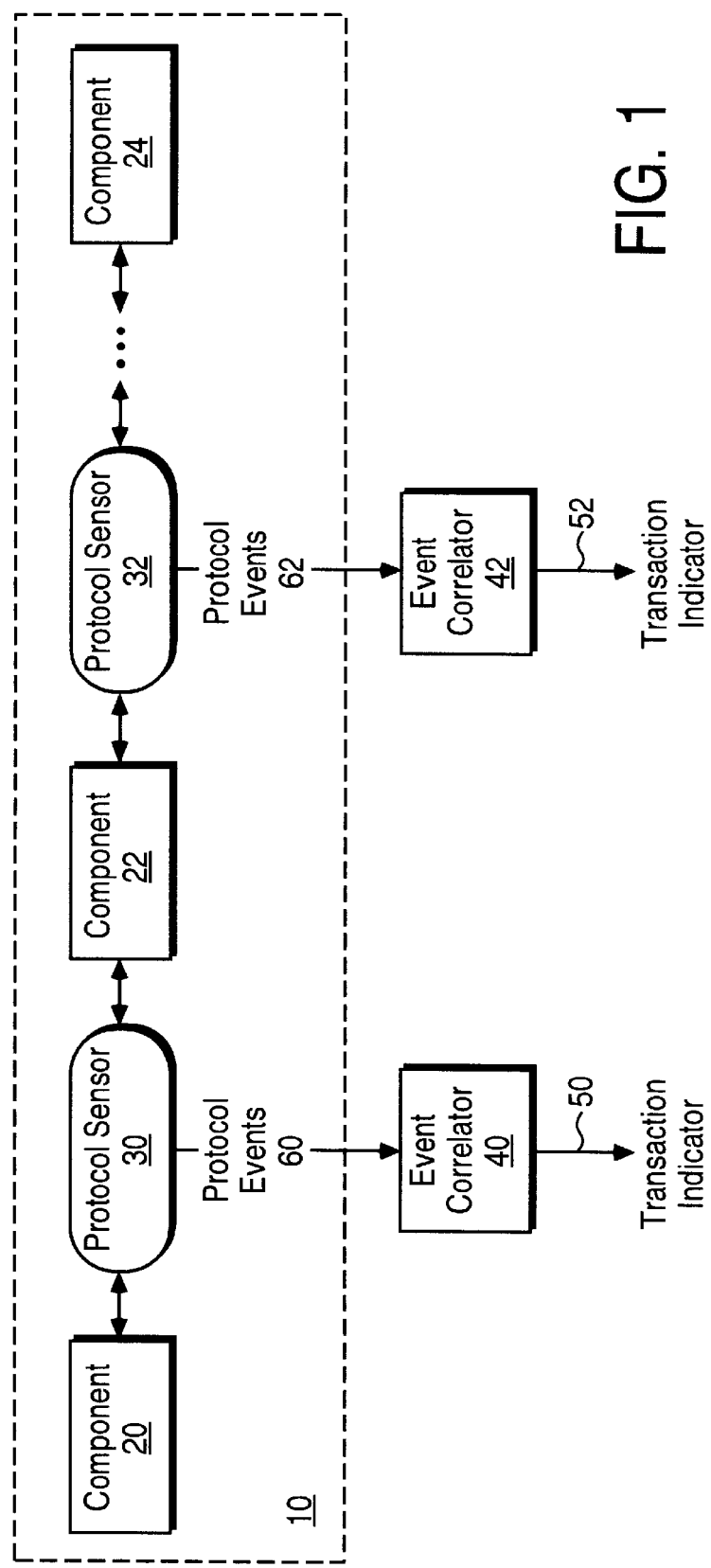
FIG. 1 shows a distributed application that includes mechanisms for correlating protocol events in a distributed application.

FIG. 1 shows a distributed application 10 that includes a set of components 20–24 along with mechanisms that enable correlation of protocol events in the distributed application 10. The distributed application 10 may be an e-commerce application, a groupware application, an order processing application, or an inventory management application to name a few examples.

The components 20–24 represent any number of hardware and/or software components of the distributed application 10. For example, any one or more of the components 20–24 may be a hardware component such as a CPU, memory, mass storage device, or network bridge. In addition, any one or more of the components 20–24 may be a software component such as a process, a file system, a data base server, a web server, a client application, or a server application to name a few examples. The components 20–24 may be implemented on the same machine or on different machines which are interconnected via communication paths.

The mechanisms that enable correlation of protocol events in the distributed application 10 include a set of protocol sensors 30–32. Each protocol sensor 30–32 is an element which intercepts and monitors the flow of information between components. The protocol sensor 30 monitors the flow of information between the components 20 and 22 and the protocol sensor 32 monitors the flow of information between the components 22 and 24.

Each protocol sensor 30–32 is adapted to a predefined protocol for its corresponding components 20–24. For example, if the component 20 is a web browser and the component 22 is a web server, then the protocol sensor 30 is adapted to intercept and monitor the flow of information according to the HTTP protocol. If the component 20 is a CPU connected to the component 22 via a PCI bus, then the protocol sensor 30 is adapted to intercept and monitor the flow of information according to the PCI protocol. Other examples of protocols to which any one or more of the protocol sensor 30–32 may be adapted include RPC, COM, ODBC, SQL, Ethernet, TCP/IP, sockets, and SMTP.

The protocol sensors 30–32 are adapted to the particular protocol and hardware platform for which they are designed but they are not adapted to any particular application in the distributed application 10. Any one or more of the protocol sensors 30–32 may be installed as part of off-the-shelf platform software. If for example the component 22 is a web server, the vendor of the web server may provide the functionality of the protocol sensor 32 as part of the standard or optional installation. Alternatively, any one or more of the protocol sensors 30–32 may be developed by third parties for each appropriate protocol and platform. It is preferable that the protocol sensor 30–32 be transparent in the sense that they do not modify the data that passes through them or impair the functioning of other components or impose significant overhead in terms of system performance.

The protocol sensors 30–32 generate corresponding streams of protocol events 60–62. Each of the protocol events 60–62 captures an entire exchange through the corresponding protocol and therefore has a protocol-specific format. For example, if the component 20 is a web browser and the component 22 is a web server, then each protocol event 60 is an HTTP protocol event according to the HTTP format.

The mechanisms that enable correlation of protocol events in the distributed application 10 also include a set of event correlators 40–42. The event correlators 40–42 determine the high level transactions that caused the corresponding protocol events 60–62. The determined high level transactions are indicated with a set of corresponding transaction indicators 50–52. The transaction indicators 50–52 provide indicators of high level transactions in the distributed application 10 such as end-user transactions or business transactions or events associated with software tasks at higher levels of the distributed application 10.

End-users interact with an application in the distributed application 10 according to a predefined set of possible actions. Possible actions include clicking on a button in a web page or pressing the return key on a field. The term end-user transaction refers to a unit of interaction by an end-user with the application and the response of the application to the unit of interaction.

High level transactions also include associations or grouping of multiple end-user transactions. An example of this is a business transaction. A business transaction is a set of possible end-user transactions which have been classed together by a business manager. Business transactions are deemed to have business significance and worth tracking and monitoring. Examples of business transactions include logging on to an application, browsing, searching for specific types of information, submitting a purchase order, etc.

The set of possible end-user transactions are generally fixed by the design of an application in the distributed application 10. The set of possible business transactions and their relationship to end-user transactions is open ended. For example, a business manager may decide to keep all browsing activities under the "browsing" transaction type or subdivide this class of transactions into "browsing item A type" and "browsing item B type," etc.

The data provided by the transaction indicators 50–52 provides a causal correlation between business transactions, software task events, and/or end-user transactions and their corresponding protocol events 60–62. Measurements of the protocol events 60–62 obtained at any level of the distributed application 10 may be related back to the business level, end-user user level, or software task level.

Consider an example in which component 24 is a data base and the protocol sensor 32 monitors SQL traffic. Data base vendors often provide tools for analyzing and tuning the performance of their data base based on the SQL traffic imposed on the data base. The event correlator 42 provides a means to extend the data base analysis back up to the higher level of the business transaction. This enable business planners to present the results of data base performance analysis in terms business transactions and enables business managers to make resource allocation and other system related decisions on the basis of business priority.

The functionality embedded in each of the event correlators 40–42 is adapted to the distributed application 10 during a training phase. After completion of the training phase, the event correlators 40–42 function in a monitoring phase in which the transaction indicators 50–52 provide causal correlation between protocol events and higher level transactions in the distributed application 10.

Figure 2:
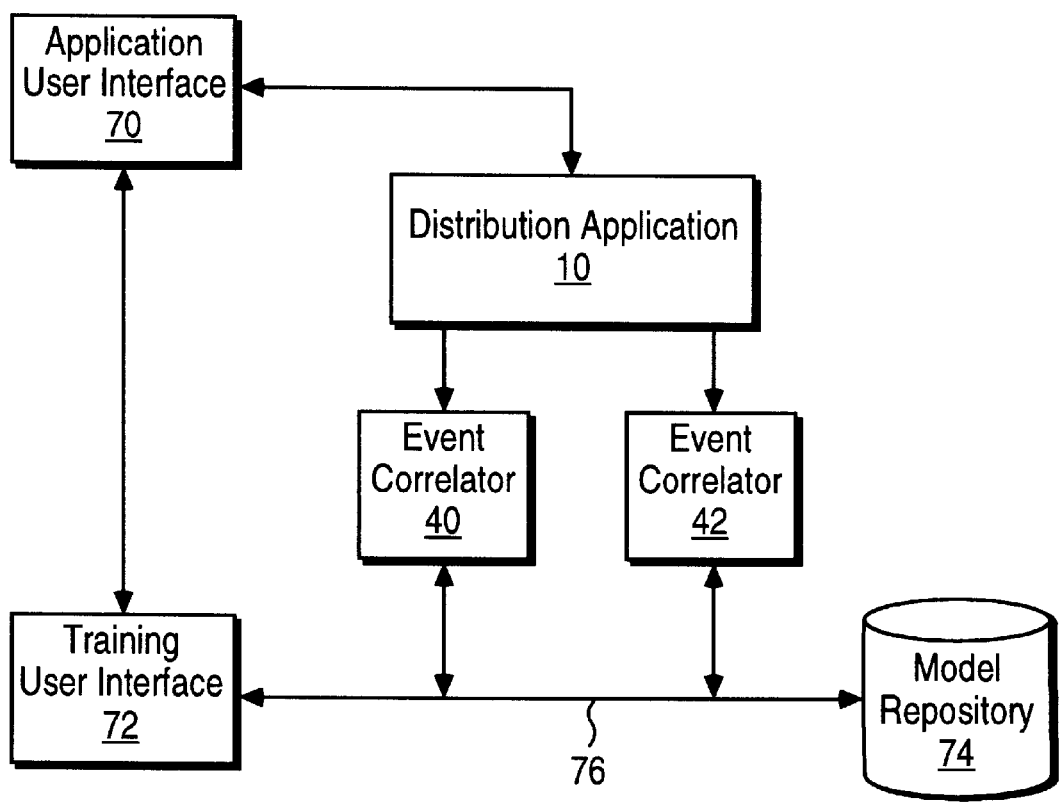
FIG. 2 shows an arrangement for a training phase of a distributed application.

FIG. 2 shows an arrangement for the training phase of the distributed application 10. The training phase arrangement includes an application user interface 70 to the distributed application 10 and a training user interface 72, along with a model repository 74. The application user interface 70 communicates with the distributed application 10 using an appropriate application user interface protocol. For example, if the distributed application 10 is a web commerce application then the application user interface protocol is the HTTP protocol. Other types of distributed applications may use different user interface protocols as appropriate.

The training user interface 72 communicates with the application user interface 70 using the relevant application programming interfaces (APIs). The training user interface 72 uses these APIs to intercept and control the events that occur in the application user interface 70. The training user interface 72 communicates with the event correlators 40–42 via a training bus 76 using a correlator training protocol. If the distributed application 10 is a web based application, then the application user interface 70, a web browser, may be embedded inside the training user interface 72 as an ActiveX control and may be controlled through the relevant API.

Figure 3:
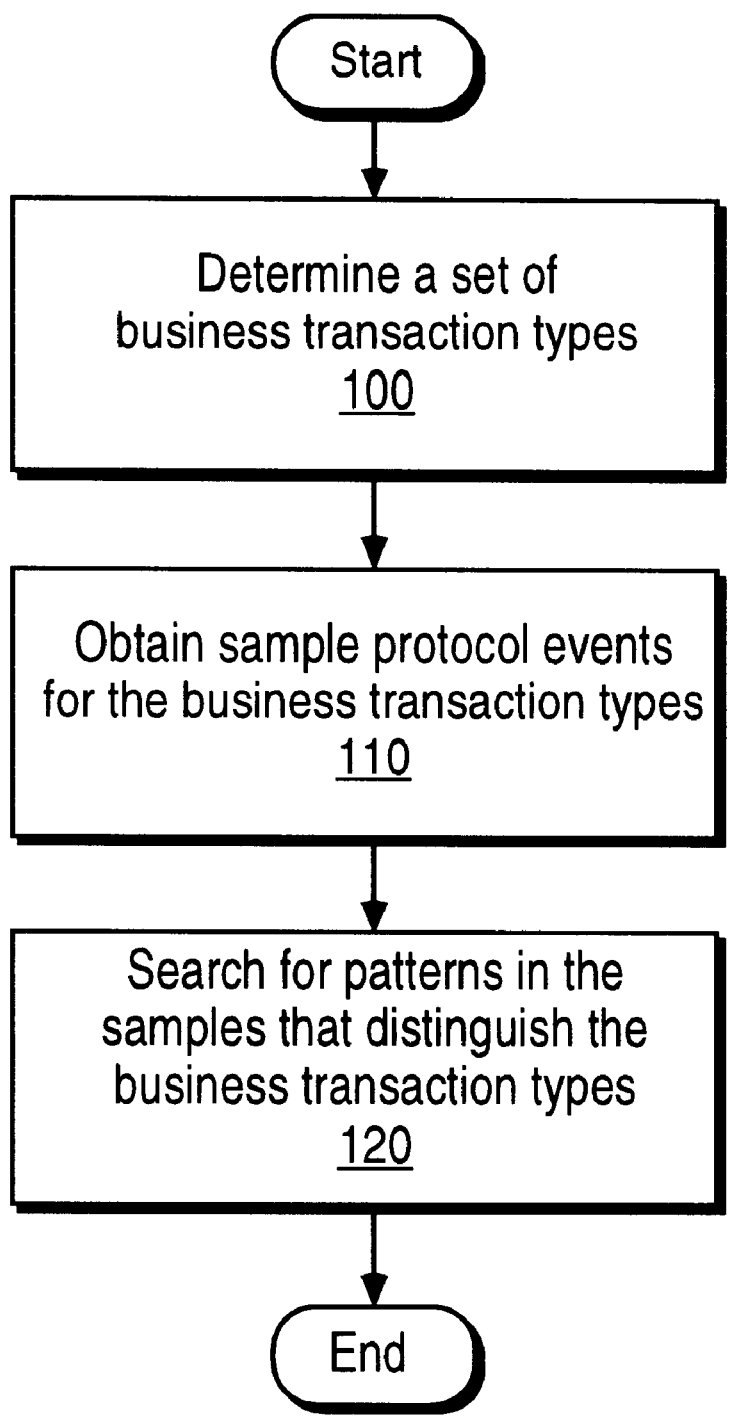
FIG. 3 illustrates the steps involved in a training phase of a distributed application in one embodiment.

FIG. 3 illustrates the steps involved in the training phase of the distributed application 10 in one embodiment. The training phase is hereinafter illustrated for an example in which the distributed application 10 is a web-based e-commerce application and the component 20 is a web browser, the component 22 is a web server, and the component 24 is a data base.

At step 100, a set of business transaction types is determined. The business transaction types are related to each other in a hierarchical structure that includes transaction types and transaction sub types.

Figure 4:
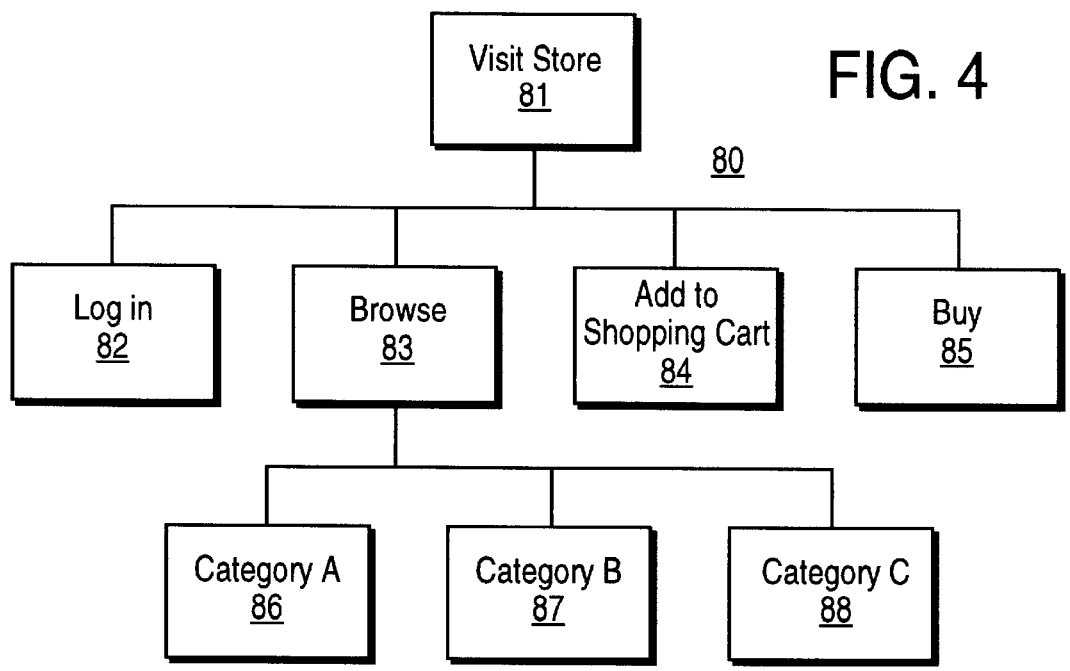
FIG. 4 illustrates an example transaction hierarchy.

FIG. 4 illustrates an example transaction hierarchy 80 determined at step 100. The transaction hierarchy 80 includes a visit store transaction type 81 with a log in transaction type 82, a browse transaction type 83, an add to shopping cart transaction type 84, and a buy transaction type 85 as sub types of the visit store transaction type 81. The sub types of the browse transaction type 81 are a category A transaction type 86, a category B transaction type 87, and a category C transaction type 88. The transaction types 81–88 may be executed using the application user interface 70, a web browser, by selecting buttons associated with the transaction types 81–88.

At step 110, a set of samples of protocol events are obtained for each of the transaction types 81–88 in the hierarchy 80 by executing a number of end-user transactions for each transaction type 81–88. The basic sub steps of step 110 include indicating on the training user interface 72 which transaction type 81–88 is to be executed and then executing that transaction type 81–88 using the application user interface 70. The information about which transaction type 81–88 is executed is transferred via the training bus 76.

Each event correlator 40–42 receives via the training bus 76 notification of which transaction type 81–88 is being executed. Each event correlator 40–42 also receive samples of the corresponding protocol events 60–62 that result from the transaction type 81–88 being executed. Each event correlator 40–42 builds a table of associations between the transaction types 81–88 and corresponding protocol events 60–62 using temporal correlations based upon which protocol events occurred after a given transaction type 81–88 was executed using the application user interface 70.

During the training phase only one user interacts with the distributed application 10. Nevertheless, it is preferable to initiate a transaction type only after the protocol events caused by the previous transaction have run their course, The possibility of erroneous correlations caused by the asynchronous nature of applications should be taken in the analysis step of the training phase.

Table 1 shows an example table of associations for the example transaction type hierarchy 80. The samples shown are obtained by the event correlator 40 an HTTP sensor.

TABLE 1

| Transaction Type | Sample |
| --- | --- |
| Browse Category A | http://www.store.com/ec_catA.asp?&sid=5&what=952 |
| Browse Category A | http://www.store.com/ec_browse.asp?&sid=5&what=958 |
| Browse Category B | http://www.store.com/ec_browse.asp?&sid=5&what=834&ct=5 |
| Browse Category B | http://www.store.com/ec_browse.asp?&sid=5&what=723&ct=5 |
| Browse Category C | http://www.store.com/ec_browse.asp?&sid=5&what=259&ct=9 |
| Browse Category C | http://www.store.com/ec_browse.asp?&sid=5&what=956&ct=9 |

At step 120, each of the event correlators 40–42 searches for patterns in its obtained samples that distinguish among the transaction types 81–88. The basic sub steps of the step 120 include a feature extraction step and a generalization step.

In the feature extraction step, each obtained sample is parsed to generate a set of name-value pairs. The method of parsing is protocol-specific. For example, a sample obtained from the protocol sensor 30 in this example is an HTTP protocol event and it is parsed based on the base page and parameter values of the sample. The name-value pairs generated for a sample is referred to as the feature list of the sample. Table 2 provides a feature list from the sample in the first entry in Table 1.

TABLE 2

| Name | Value |
| --- | --- |
| machine | www.store.com |
| page | ec_catA.asp |
| sid | 5 |
| what | 952 |

The feature extraction step yields a set of feature lists associated with each of the transaction types 81–88. Each feature list includes a set of name-value pairs.

In the generalization step, the feature lists are analyzed to generate a trigger for each transaction type 81–88. A trigger is a boolean expression on the name-value pairs of the feature lists. For example, Table 3 shows the triggers yielded by the generalization step applied to the feature lists obtained from Table 1.

TABLE 3

| Transaction Type | Trigger |
| --- | --- |
| Category A | page=ec_catA.asp |
| Category B | page=ec_browse.asp&ct=5 |
| Category C | page=ec_browse.asp&ct=9 |

It is preferable that the triggers created at the generalization step be specific enough to differentiate between the transaction types 81–88 given the obtained samples but not any more specific than necessary. A variety of known machine learning techniques may be applied to generate the triggers from the feature sets.

The triggers generated during the training phase are stored in the model repository 74. The triggers are then loaded from the model repository 74 into the appropriate ones of the event correlators 40–42 for use during the monitoring phase in the distributed application 10.

In the monitoring phase in the distributed application 10, the event correlators 40–42 map the corresponding protocol events 60–62 to the transaction types 81–88 and provide indications of the transaction types 81–88 via the transaction indicators 50–52.

Figure 5:
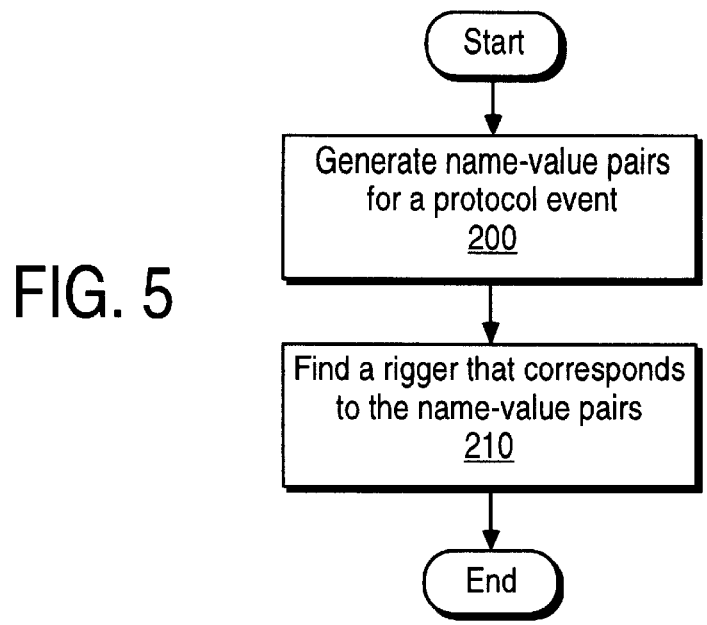
FIG. 5 shows the steps involved in mapping protocol events to transaction types.

FIG. 5 shows the steps involved in mapping the protocol events 60–62 to the transaction types 81–88 during the monitoring phase of the distributed application 10. At step 200, a set of name-value pairs for an obtained protocol event are generated using steps similar to those set forth above for the feature extraction step in the training phase.

At step 210, a trigger is found whose boolean expression is satisfied by the name-value pairs from step 200. If such a trigger is found then the appropriate transaction indicator 50–52 is generated. For example, assume the protocol event being mapped by the event correlator 40 is as follows.

http://www.store.com/ec_browse.asp?&sid=5&what=923&ct=5

Table 4 shows the name-value pairs generated by the event correlator 40 at step 200 in response to this sample protocol event.

TABLE 4

| Name | Value |
|------|-------|
| machine | www.store.com |
| page | ec_browse.asp |
| sid | 5 |
| what | 923 |
| ct | 5 |

The event correlator 40 at step 210 searches through the triggers (Table 3) generated during the training phase and recognizes that the name-value pairs of Table 4 satisfy the boolean expression for the category B trigger. The event correlator 40 generates the transaction indicator 50 to indicate that the category B transaction type 87 has occurred.

The techniques disclosed herein enable definition of business transaction types for existing applications and correlation of business transaction types with lower level protocol events without changes to the application code and without new custom code for applications. These techniques are readily applied to existing applications. These techniques are also flexible in that the business transaction model may be changed after an application has been developed and deployed. In addition, these techniques do not require dedicated efforts to code event correlators for different applications and transaction models. The business transaction model can be defined more quickly and deployed with less cost. Changes to the transaction model or structure of an application do not require recoding of the event correlators. Such changes are accommodated by retraining the event correlators, thereby saving time and costs.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed application, comprising:
   a set of components;
   a set of protocol sensors associated with the components, each protocol sensor for detecting a series of protocol events generated by a corresponding one of the components;
   a trigger associated with each of a set of high level transactions that may occur in the distributed application wherein the triggers are determined during a training phase in the distributed application;
   a set of event correlators associated with the protocol sensors, each event correlator for determining which of the high level transactions caused the corresponding protocol events by determining a set of features of each protocol event and finding the triggers that correspond to the features.

2. The distributed application of claim 1, wherein the components include one or more hardware components.

3. The distributed application of claim 1, wherein the components include one or more software components.

4. The distributed application of claim 1, wherein one or more of the high level transactions is an end-user transaction.

5. The distributed application of claim 1, wherein one or more of the high level transactions is a business transaction.

6. The distributed application of claim 1, wherein during the training phase a set of end-user transactions associated with the high level transactions are executed in the distributed application and a set of samples are obtained from the protocol sensors.

7. The distributed application of claim 6, wherein during the training phase a set of tables are constructed that associate the samples to the high level transactions that caused the samples.

8. The distributed application of claim 6, wherein during the training phase the tables are analyzed to determine the triggers for determining the high level transactions.

9. A method for correlating protocol events in a distributed application, comprising the steps of:
   determining a trigger for each of a set of high level transactions that may occur in the distributed application during a training phase in the distributed application;
   detecting a series of protocol events generated by each of a set of components of the distributed application;
   determining which of the high level transactions caused the corresponding protocol events by determining a set of features of each protocol event and finding the triggers that correspond to the features.

10. The method of claim 9, wherein the step of determining which of the high level transactions caused the corresponding protocol events comprises the step of determining which of a set of end-user transactions in the distributed application caused the corresponding protocol events.

11. The method of claim 9, wherein the step of determining which of the high level transactions caused the corresponding protocol events comprises the step of determining which of a set of business transactions in the distributed application caused the corresponding protocol events.

12. The method of claim 9, wherein the training phase comprises the steps of executing a set of end-user transactions associated with the high level transactions and obtaining a set of samples of the protocol events.

13. The method of claim 12, wherein the training phase further comprises the step of constructing a set of tables that associate the samples to the high level transactions that caused the samples.

14. The method of claim 12, wherein the training phase further comprises the step of analyzing the tables to determine the triggers for the high level transactions.

* * * * *